United States Patent
Lee et al.

(10) Patent No.: US 9,750,043 B2
(45) Date of Patent: Aug. 29, 2017

(54) METHOD FOR SUPPORTING COMMUNICATION USING TWO OR MORE RADIO ACCESS TECHNOLOGIES AND APPARATUS FOR SAME

(71) Applicant: LG Electronics Inc., Seoul (KR)

(72) Inventors: Eunjong Lee, Anyang-si (KR); Heejeong Cho, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/417,461

(22) PCT Filed: Jul. 26, 2013

(86) PCT No.: PCT/KR2013/006744
§ 371 (c)(1),
(2) Date: Jan. 26, 2015

(87) PCT Pub. No.: WO2014/017873
PCT Pub. Date: Jan. 30, 2014

(65) Prior Publication Data
US 2015/0201427 A1    Jul. 16, 2015

Related U.S. Application Data

(60) Provisional application No. 61/676,312, filed on Jul. 26, 2012, provisional application No. 61/692,241, filed on Aug. 23, 2012.

(51) Int. Cl.
*H04W 72/00* (2009.01)
*H04W 72/12* (2009.01)
(Continued)

(52) U.S. Cl.
CPC ....... *H04W 72/1215* (2013.01); *H04W 74/02* (2013.01); *H04W 76/046* (2013.01); *H04W 88/06* (2013.01)

(58) Field of Classification Search
CPC combination set(s) only.
See application file for complete search history.

(56) References Cited

U.S. PATENT DOCUMENTS

| | | |
|---|---|---|
| 2009/0180451 A1 | 7/2009 | Alpert et al. |
| 2010/0113024 A1* | 5/2010 | Wu .................. H04W 36/14 |
| | | 455/436 |

(Continued)

FOREIGN PATENT DOCUMENTS

| | | |
|---|---|---|
| KR | 1020030042838 | 6/2008 |
| KR | 1020110066744 | 6/2011 |

(Continued)

*Primary Examiner* — Idowu O Osifade
(74) *Attorney, Agent, or Firm* — Dentons US LLP (57) ABSTRACT

A method for supporting communication using two or more heterogeneous radio access technologies (RAT) can include the steps of: receiving a first message requesting that notification be provided as to whether to support simultaneous access to two or more RATs from a base station in a first communication network supporting a first RAT; and transmitting, to the base station in the first communication network, a second message including an indicator indicating whether to support simultaneous access to the two or more RATs in response to the first message.

10 Claims, 6 Drawing Sheets

(51) Int. Cl.
  *H04W 74/02* (2009.01)
  *H04W 76/04* (2009.01)
  *H04W 88/06* (2009.01)

(56) References Cited

U.S. PATENT DOCUMENTS

2011/0310851 A1* 12/2011 Klingenbrunn ..... H04W 76/041
   370/332
2016/0212672 A1* 7/2016 Fu ........................ H04W 36/22

FOREIGN PATENT DOCUMENTS

KR   1020110084278   7/2011
KR   1020110129324   12/2011

* cited by examiner

FIG. 6 mini# METHOD FOR SUPPORTING COMMUNICATION USING TWO OR MORE RADIO ACCESS TECHNOLOGIES AND APPARATUS FOR SAME This application is a 35 USC §371 National Stage entry of International Application No. PCT/KR2013/006744 filed on Jul. 26, 2013, and claims priority to U.S. Provisional Application Nos. 61/692,241 filed on Aug. 23, 2012 and 61/676,312 filed on Jul. 26, 2012, all of which are hereby incorporated by reference in their entireties as if fully set forth herein.

TECHNICAL FIELD

The present invention relates to a wireless communication, and more particularly, to a method of supporting signal transmission and reception using two or more radio access technologies (RAT) and an apparatus therefor.

BACKGROUND ART

There may exist a multi-RAT user equipment capable of accessing two or more radio access technologies (RATs). In order to access a specific RAT, a connection to the specific RAT is established based on a request of a user equipment and then data transmission and reception can be performed. Yet, although the multi-RAT UE is capable of accessing two or more RATs, the multi-RAT UE is unable to access multiple RATs at the same time. In particular, although a user equipment is equipped with a multi-RAT capability, the user equipment is unable to simultaneously transmit and receive data via RATs different from each other.

Since a legacy multi-RAT technology corresponds to a switching-based multi-RAT technology, a data is transmitted in a manner of being switched by a different RAT. Hence, it is difficult to select a RAT appropriate for a flow characteristic. A solution for the aforementioned problem is not proposed yet.

DISCLOSURE OF THE INVENTION

Technical Tasks

One technical task intended to achieve by the present invention is to provide a method for a user equipment to support a signal transmission and reception using two or more radio access technologies (RATs).

Another technical task intended to achieve by the present invention is to provide a method for a base station to support a signal transmission and reception using two or more radio access technologies (RATs).

Another technical task intended to achieve by the present invention is to provide a user equipment supporting a signal transmission and reception using two or more radio access technologies (RATs).

The other technical task intended to achieve by the present invention is to provide a base station supporting a signal transmission and reception using two or more radio access technologies (RATs).

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of supporting signal transmission and reception using two or more radio access technologies (RATs) by a user equipment, includes the steps of receiving a first message for requesting information on whether the user equipment supports simultaneous access to the two or more RATs from a base station of a first communication network supporting a first RAT and transmitting a second message including an indicator indicating whether the user equipment supports the simultaneous access to the two or more RATs to the base station of the first communication network in response to the first message. The second message further includes information on a type of a second RAT supported by the user equipment and the first communication network supporting the first RAT and a second communication network supporting the second RAT are heterogeneous networks for each other. The second message may further include information on a desired traffic type for transmission and reception via the second communication network supporting the second RAT by the user equipment. The method can further include the step of receiving a third message including information on a candidate base station of the second communication network supporting the second RAT from the base station of the first communication network in response to the second message.

The method can further include the step of receiving a third message including information on a candidate base station of the second communication network supporting the second RAT from the base station of the first communication network in response to the second message. The method can further include the steps of performing scanning based on the information on the candidate base station and simultaneously exchanging data with a base station of the second communication network selected as a result of the scanning and the base station of the first communication network. The method can further include the steps of receiving an RRC (radio resource control) connection configuration message including an indicator from the base station of the first communication network, the indicator, the indicator indicating that traffic corresponding to the desired traffic type for transmission and reception via the second communication network supporting the second RAT from the base station of the first communication network and if the indicator indicating that the traffic corresponding to the desired traffic type for transmission and reception via the second communication network supporting the second RAT is identified, performing scanning based on the information on the candidate base station. The method can further include the step of transmitting or receiving traffic not corresponding to the desired traffic type with the base station of the first communication network while transmitting or receiving the traffic corresponding to the desired traffic type for transmission and reception via the second communication network supporting the second RAT with a base station of the second communication network selected as a result of the scanning at the same time. The first message and the second message are exchanged with the base station of the first communication network in case of performing an initial network entry process. The first message corresponds to a UECapabilityEnquiry message and the second message corresponds to a UECapabilityInformation message.

To further achieve these and other advantages and in accordance with the purpose of the present invention, according to a different embodiment, a method of supporting signal transmission and reception using two or more radio access technologies (RATs) by a base station, includes the steps of transmitting a first message requesting for information on whether simultaneous access to the two or more RATs is supported to a user equipment and receiving a second message including an indicator indicating whether the simultaneous access to the two or more RATs is supported from the user equipment in response to the first message. The second message further includes information on a type of a second RAT capable of being supported by the user equipment and a first communication network supporting a first RAT and a second communication network supporting the second RAT are heterogeneous networks for each other. The second message further includes information on a desired traffic type for transmission and reception via the second communication network supporting the second RAT by the user equipment. The method can further include the step of transmitting a third message including information on a candidate base station of the second communication network supporting the second RAT to the user equipment in response to the second message. The method can further include the steps of transmitting an RRC (radio resource control) connection configuration message including an indicator indicating that traffic corresponding to a desired traffic type for transmission and reception via the second communication network supporting the second RAT to the user equipment and transmitting or receiving traffic not corresponding to the desired traffic type with the user equipment while transmitting or receiving the traffic corresponding to the desired traffic type for transmission and reception via the second communication network supporting the second RAT with a base station of the second communication network.

To further achieve these and other advantages and in accordance with the purpose of the present invention, according to a further different embodiment, a user equipment configured to support signal transmission and reception using two or more radio access technologies (RATs) includes a receiver, a transmitter and a processor, the processor configured to control the receiver to receive a first message for requesting information on whether the user equipment supports simultaneous access to the two or more RATs from a base station of a first communication network supporting a first RAT, the processor configured to control the transmitter to transmit a second message including an indicator indicating whether the user equipment supports the simultaneous access to the two or more RATs to the base station of the first communication network in response to the first message.

To further achieve these and other advantages and in accordance with the purpose of the present invention, according to a further different embodiment, a base station configured to support signal transmission and reception using two or more radio access technologies (RATs) includes a transmitter, a receiver and a processor, the processor configured to control the transmitter to transmit a first message for requesting information on whether simultaneous access to the two or more RATs is supported to a user equipment, the processor configured to receive a second message including an indicator indicating whether the simultaneous access to the two or more RATs is supported from the user equipment in response to the first message.

Advantageous Effects

According to various embodiments of the present invention, a user equipment supporting both a cellular and a WLAN can efficiently perform selection of a heterogeneous network for a flow via a control of a cellular network in a wideband wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 1:
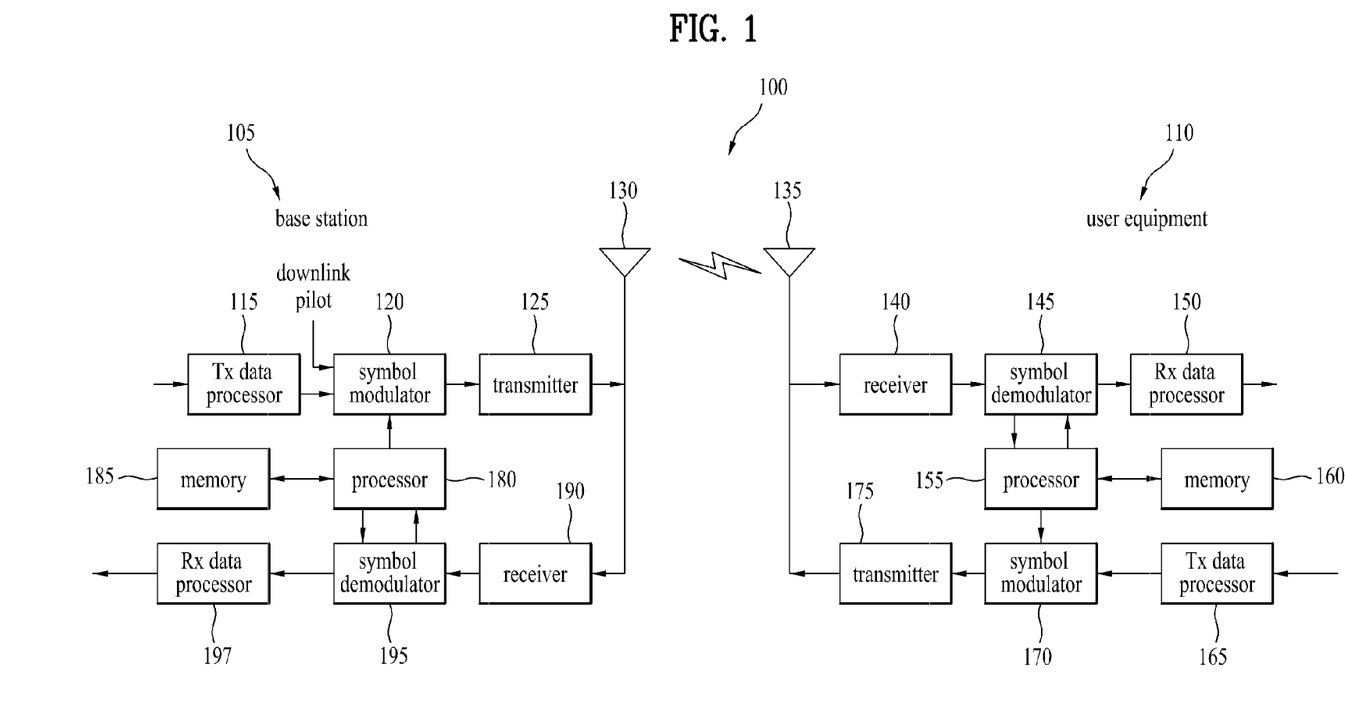
FIG. 1 is a block diagram for a configuration of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes a method for a user equipment supporting both a cellular network and a wireless LAN (e.g., WLAN) to efficiently select a heterogeneous network for a flow in a wideband wireless communication system.

Figure 2:
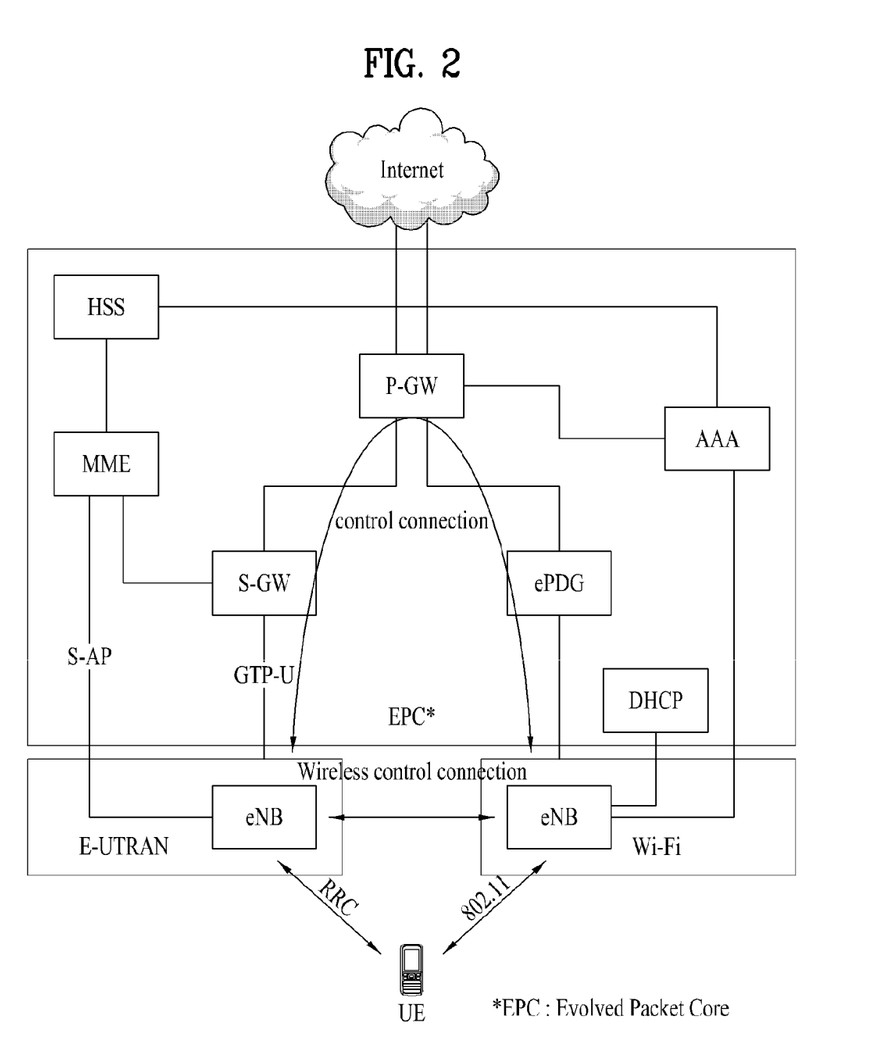
FIG. 2 is a diagram for an example of a network structure for explaining an interworking structure of a first communication system (e.g., LTE system) and a second communication system (e.g., Wi-Fi system)

FIG. 2 is a diagram for an example of a network structure for explaining an interworking structure of a first communication system (e.g., LTE system) and a second communication system (e.g., Wi-Fi system).

In a network structure shown in FIG. 2, there may exist a backhaul control connection between an AP and an eNB and a wireless control connection between the AP and the eNB via a backbone network (e.g., P-GW) or an EPC (evolved packet core). For peak throughput and data traffic off-loading, a user equipment (hereinafter abbreviated UE) can support both a first communication system (or first communication network) using a first wireless communication scheme and a second communication system (or second communication network) via interworking between a plurality of communication networks. In this case, the first communication network or the first communication system is called a primary network or a primary system and the second communication network or the second communication system can be called a secondary network or a secondary system. For instance, a UE can be configured to support LTE (or LTE-A) and Wi-Fi (a short range communication system such as WLAN/802.11) at the same time. In the present specification, the UE can be called a multi-system supporting UE (multi-system capability UE).

In a network structure shown in FIG. 2, a primary system has a wider coverage and may correspond to a network used for transmitting control information. Examples of the primary system may include WiMAX or LTE system. Meanwhile, a secondary system has a narrower coverage and may correspond to a system used for transmitting data. For instance, the secondary network may correspond to such a wireless LAN system as WLAN or Wi-Fi.

Figure 3:
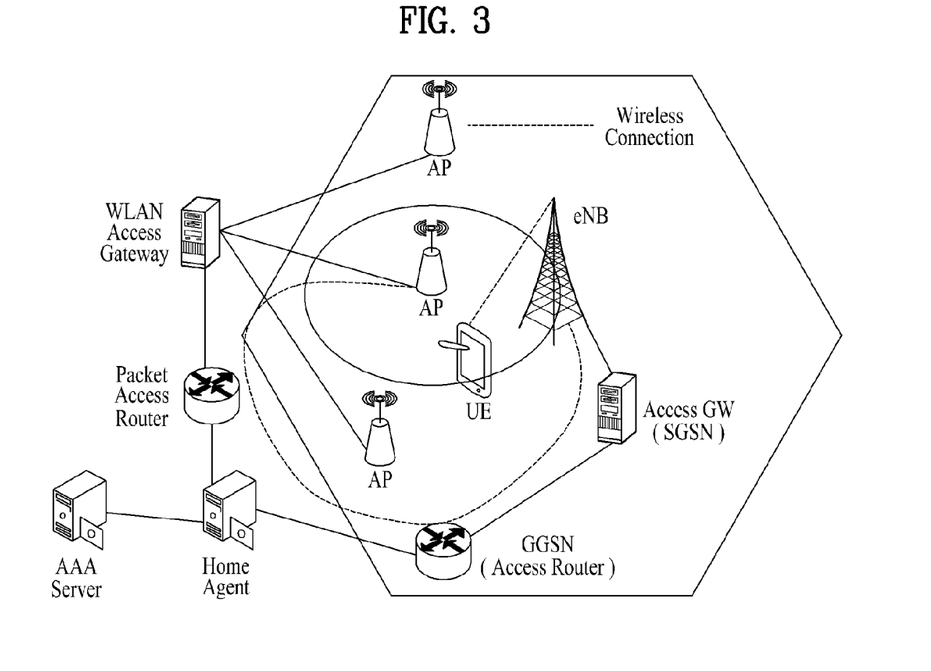
FIG. 3 is an exemplary diagram explaining a scenario according to the present invention.

FIG. 3 is an exemplary diagram explaining a scenario according to the present invention.

Specifically, FIG. 3 shows a scenario including a backhaul control connection between an AP and a base station via a backbone network, an AP of a secondary system can be seen as an entity operating in a manner of being identical to an operation of a UE equipped with an LTE capability.

In the following, a definition associated with a multi-radio access technology (multi-RAT) system to be described in the present invention is explained.

Primary System

A primary system corresponds to a system of a wider coverage. The primary system is always in a connected state with a multi system supporting UE in a network including a status (or RRC connection) or a network in DRX (discontinuous reception) or an idle status.

While a connection with a primary network is established, the multi system supporting UE can indicate that the multi system supporting UE has capability for a heterogeneous network (e.g., WLAN) to an eNB of the primary system. In this case, indication on whether multi system is supportive (multi-system capability) can be transmitted in a manner of being included in an RRCCoonectionSetup message as a new field. If the indication (e.g., WLANAccessAvailable or MultiRATAccessAvailable) on whether the multi system is supportive corresponds to 1, a UE and an eNB share capability necessary for a multi system with each other via a specific procedure for the multi system supporting UE.

The eNB of the primary system can periodically transmit information on other systems (secondary systems) belonging to an identical coverage via a broadcast message or a unicast message for the multi system UEs. If deployment of the secondary system changes, an updated message can be transmitted to notify addition/deletion/modification information of the secondary system.

Secondary System

A secondary system is a system of a narrower coverage. For instance, the secondary system may correspond to WLAN, Wi-Fi system. The secondary system is a system capable of being added or deleted if necessary. The secondary system can be mainly used for data transmission and reception requiring a higher bandwidth (BW). In this case, a specific flow (QoS) can be mapped.

Connection or release between a secondary system and a UE can be performed after a primary system checks the connection or the release. In this case, the connection may mean that data is ready to be transmitted or received or data is actually transmitted and received.

If a UE is detected in a coverage of a secondary system, information on the UE, which has accessed the secondary system, can be received via a primary system. In this case, actual data transmission and reception may not immediately occur.

If a UE has data to transmit and receive via a secondary system, access information on a corresponding flow can be received via a primary system. In this case, actual data transmission and reception may immediately occur.

Figure 4:
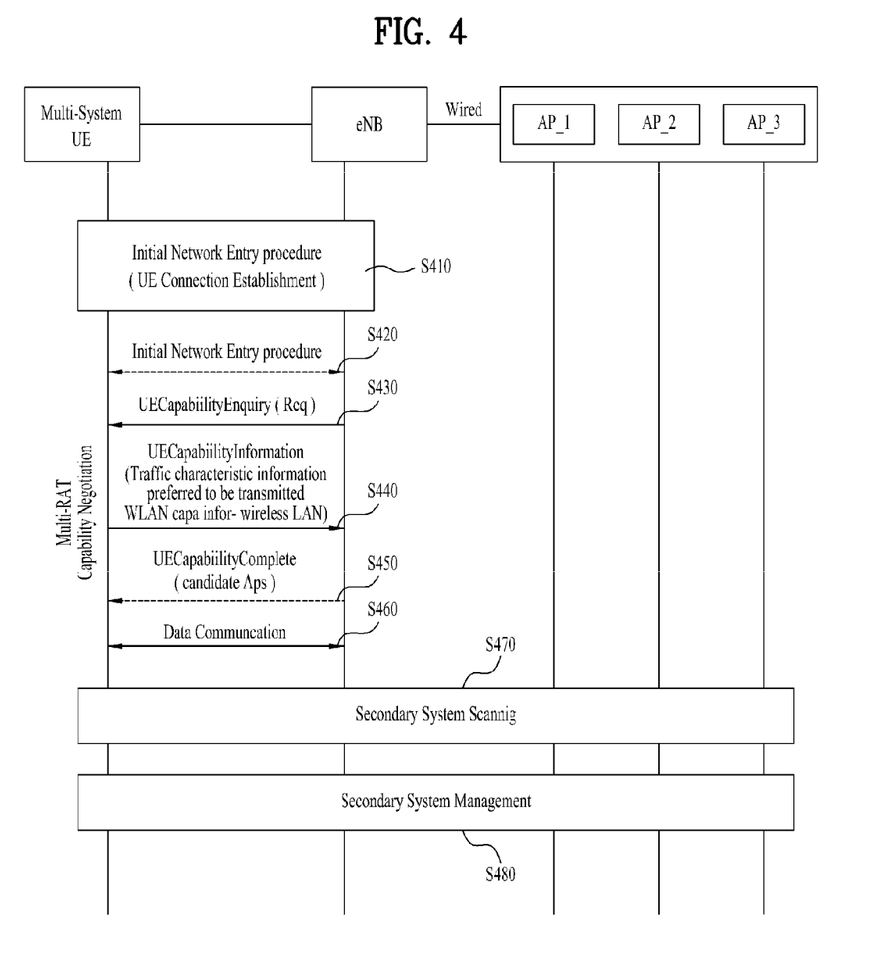
FIG. 4 is an exemplary flowchart for explaining a multi-system supporting-related negotiation procedure according to the present invention.

FIG. 4 is an exemplary flowchart for explaining a multi-system supporting-related negotiation procedure according to the present invention.

In particular, FIG. 4 relates to UE capability negotiation of a LTE-based UE. FIG. 4 explains a process of receiving heterogeneous network-related information of a UE by an eNB capable of performing a heterogeneous network interworking technology such as a wireless LAN in a manner that the eNB transmits a UECapabilityEnquiry message to the UE.

Referring to FIG. 4, a UE (i.e., multi-system UE) and a primary system (i.e., an eNB of the primary system) perform an initial network entry procedure [S410]. In particular, the UE performs initial connection establishment with the primary system. If the primary system corresponds to LTE system, the UE performs an initial RRC (radio resource control) connection establishment procedure of legacy LTE. In the initial network entry procedure, the UE can inform the eNB that the UE corresponds to a UE capable of supporting multiple systems or multiple radio access technologies. For instance, the UE can indicate the eNB via an RRCConnectionRequest message. Or, the UE can indicate the eNB in an RRCConnectionSetup process. The UE can indicate the eNB in a manner of additionally transmitting such a parameter (e.g., 1-bit size) as "MultiRATAccessAvailable" in the RRCConnectionRequest message or the RRCConnectionSetup process.

If there exist common information of a base station (hereinafter, AP) of a secondary system necessary for the UE to receive, a base station of the primary system (hereinafter, eNB) can transmit information on the secondary system to the UE [S420].

the multi-system or the multi-RAT at the same time or whether the UE is capable of supporting a prescribed system. The UE-CapabilityRequest parameter can be transmitted in a manner of including a parameter on a new radio access technology (RAT) (i.e., unlicensed band) such as Wi-Fi, WLAN or 802.11.

The UE transmits a UECapabilityInformation message to the eNB in response to the UECapabilityEnquiry message [S440]. For instance, the UECapabilityInformation message may include WiFi-related capability information.

The UECapabilityInformation message can include an indicator indicating whether the UE supports access to a plurality of radio access technologies or a system type at the same time and information on a radio access technology and a system type capable of being supported. For instance, if the radio access technology capable of being supported corresponds to WiFi, the UECapabilityInformation message can additionally include 802.11 MAC address of the UE (for authentication information). And, the UECapabilityInformation message can include previously accessed AP information (UE's preferred AP). It is preferable to transmit the previously accessed AP information to an eNB to which the previously accessed AP belongs only. And, the UECapabilityInformation message can additionally include protocol version (11a/b/n . . . ) information and information on a traffic type or a property (e.g., EPS bearer QoS type) preferred to be transmitted or received via WLAN. The information on the traffic type or the property shall be described later.

As mentioned in the foregoing description, when the UECapabilityInformation message and the UECapabilityInformation message are exchanged between the UE and the eNB, it is necessary to additionally add contents shown in Table 1 in the following to a legacy standard specification 3GPP TS 36.331.

TABLE 1

5.6.3.3 Reception of the UECapabilityEnquiry by the UE (3GPP TS 36.331) 에 아래 내용추가
The UE shall:
1> set the contents of UECapabilityInformation message as follows:
2>   if the ue-CapabilityRequest includes wifi and if the UE supports WiFi (or WLAN or 802.11x) domain:
3>     include the UE radio access capabilities for WiFi within a ue-CapabilityRAT-Container and with
the rat-Type set to WiFi(or WLAN or 802.11x);
1> submit the UECapabilityInformation message to lower layers for transmission, upon which the
procedure ends Meanwhile, unlike what is explained in the step S410 of FIG. 4, multi-system (or multi-RAT) capability negotiation of the UE can be performed after the initial connection establishment.

In case of reestablishing a connection, the multi-system (or multi-RAT) capability negotiation can be omitted. In case of making a handover, a target eNB can perform a pre-negotiation with a serving eNB via a backbone network. The eNB can store the multi-system capability of the UE for a prescribed time after the UE enters RRC_IDLE. If a network reconfiguration is performed before multi-system information retaining time elapses, the multi-system (or multi-RAT) capability negotiation can be omitted.

The eNB can transmit a message inquiring (e.g., whether the UE is capable of supporting simultaneous access to a multi-system or a multi-RAT, whether the UE is capable of supporting simultaneous access to a system or a RAT) capability of the UE to the UE [S430]. The message can be called "UECapabilityEnquiry". A UE-CapabilityRequest parameter is added to the UECapabilityEnquiry message and the added parameter is transmitted in a manner of including content inquiring whether the UE is capable of supporting Having received the radio access technology or the system type information capable of being supported from the UE via the UECapabilityInformation message, the eNB transmits a UECapabilityComplete message or a UECapabilityResponse message to the UE [S450]. The UECapabilityComplete message or the UECapabilityResponse message can include candidate Aps information.

In case of FIG. 4, the UE transmits the UECapabilityInformation message (2 step) only when the legacy UECapabilityEnquiry message is transmitted (1 step). In this case, the eNB can transmit the UECapabilityComplete message in response to the UECapabilityInformation message (3 step). This is an optional process. Hence, the multi-RAT capability negotiation procedure can consist of 2 or 3 steps.

Meanwhile, the multi-RAT capability negotiation procedure can consist of 1 or 2 steps. The UECapabilityInformation message can be transmitted to the eNB using an unsolicited scheme without the legacy UECapabilityEnquiry message on the basis of determination of the UE (1 step). In this case, the eNB may transmit the UECapabilityComplete message to the UE in response to the UECapabilityInformation message (optional) (2 step).

Subsequently (after the step S450), the UE can exchange data with the eNB [S460] and can select an AP by performing a secondary system scanning based on a candidate AP list (or APs) received in the step S450 [S470]. After the scanning is performed, the UE can perform secondary system management [S480]. In this case, there is a trigger condition necessary for performing the secondary system (e.g., AP) management. Before a definition of the trigger condition is explained, a QoS (quality of service) indicating a traffic status is briefly explained with an example of 3GPP LTE system.

Figure 5:
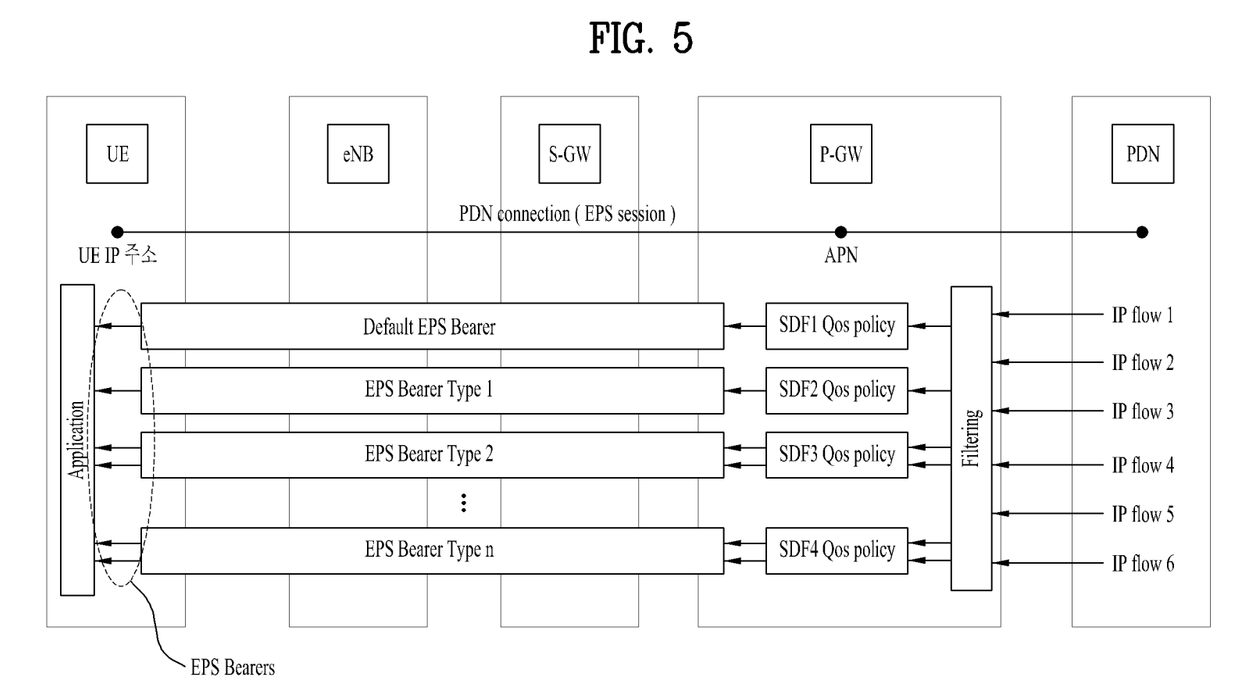
FIG. 5 is an exemplary diagram for explaining a traffic characteristic in LTE system.

FIG. 5 is an exemplary diagram for explaining a traffic characteristic in LTE system.

Referring to FIG. 5, if a UE accesses an LTE network, an EPS (evolved packet system) bearer from the UE to a P-GW (UE-eNB-S-GW-P-GW) is generated (a tunnel of a GTP scheme). A plurality of the EPS bearers can be generated according to each service characteristic. For instance, an EPS bearer for the Internet, an EPS bearer for IPTV, an EPS bearer for VoIP and the like can be generated. Characteristic of A default EPS bearer and characteristic of a dedicated EPS bearer are explained in the following.

Default EPS bearer—a QoS characteristic of the default EPS bearer corresponds to a non-GBR (non-guaranteed bit rate), e.g., Internet service Dedicated EPS bearer—the dedicated EPS bearer can be generated by either a GBR or a non-GBR. For instance, if the dedicated EPS bearer is used for a VoD service, the dedicated EPS bearer can be generated by the GBR.

LTE QoS is briefly explained in the following.

According to a legacy LTE, a definition on a traffic characteristic is defined in a network level (i.e., P-GW). A P-GW defines a 5-tuple service data flow and an eNB defines a GBR or a non-GBR.

PDN connection: IP connection between a UE and a PDN (UE is identified by an IP address and a PDN is identified by an APN)

EPS session: a meaning identical to the PDN connection. EPS session includes one or more EPS bearers. An IP address is assigned to a UE. The EPS session is maintained as long as the UE accesses an IP network.

EPS bearer: a delivery path established between a UE and a P-GW to transmit IP traffic using a specific QoS. Each EPS bearer is configured by QoS parameters indicating a characteristic of the delivery path.

Default bearer—a firstly generated EPS bearer when a new PDN connection is established. The default bearer is maintained until the PDN connection is terminated. The default bearer is always configured by a non-GBR form.

Dedicated bearer—an EPS bearer additionally generated by on-demand after a PDN connection is established. The dedicated bearer is configured by either a GBR or a non-GBR form.

SDF (service data flow): an IP flow corresponding to a service or a group of IP flows. The SDF is identified by an IP of a packet or a TCP/UDP header. A different QoS is applied according to the SDF and a PCC rule is applied by PCRF. The SDF is delivered by an EPS bearer capable of satisfying QoS of the SDF. Many SDFs can be mapped to an identical EPS bearer. User traffic has a different QoS characteristic according to a service (or an application) in use. The SDF corresponds to an IP flow of which user traffic is filtered according to a service or a group of IP flows. A specific QoS policy is applied according to a subscriber level of a UE and an application in use. IP flows heading to a user are classified into SDFs via an SDF template (classifier) according to a service characteristic and the SDFs are delivered to the user in a manner that a QoS policy (e.g., bandwidth control) is applied according to an SDF. In EPS delivery network, a QoS is transmitted in a manner of being mapped to an EPS bearer.

EPS bearer: as mentioned in the foregoing description, a type of an EPS bearer is classified into a default EPS bearer and a dedicated EPS bearer. When a UE accesses an LTE network, an IP address is assigned to the UE, a PDN connection is established and the default EPS bearer is generated at the same time. While using a service (e.g., the Internet) via the default bearer, if the UE uses a service (e.g., VoD) to which a QoS is unable to be provided by the default bearer, a dedicated bearer is generated by on-demand. In particular, the dedicated bearer is configured by a QoS different from a bearer configured in advance. A UE can access multiple APNs and can set a single default EPS bearer and a plurality of dedicated EPS bearers to a single APN. Maximum 11 EPS bearers can be configured.

The default bearer is generated when a UE initially accesses a network. Although a service is not used, the default bearer is continuously maintained and is disappeared when the UE leaves from the network. A single default bearer is generated per an APN. When a UE initially accesses a network, how to generate a default bearer by applying which QoS via which APN is provisioned in a HSS using subscriber information of a user. When the UE initially accesses the network, an MME downloads the subscriber information of the user from the HSS and generates a default bearer via a corresponding PDN using a subscriber QoS profile.

SDF QoS: QCI (QoS class identifier) and ARP (allocation and retention priority) correspond to basic QoS parameters commonly applied to all SDFs. The QCI correspond to an identifier represented by an integer value (1-9) by standardizing QoS characteristics different from each other. A standardized QoS characteristic is represented by a resource type, priority, a packet delay budget and a packet error loss rate. SDF is classified into a GBR type SDF of which a network resource is fixedly allocated according to a resource type and a non-GBR type SDF of which a network resource is not fixedly allocated according to a resource type. Besides the QCI and the ARP, GBR (guaranteed bot rate) and MBR (maximum bit rate) are assigned to the GBR type SDF as a QoS parameter and the MBR is assigned to the non-GBR type SDF.

GBR type SDF QoS parameter: QCI, ARP, GBR (DL/UL), MBR (DL/UL)

Non-GBR type SDF QoS parameter: QCI, ARP, MBR (DL/UL)

SDF is mapped to an EPS bearer in a P-GW and is delivered to a UE via the EPS bearer. SDFs (SDF aggregate) including an identical QCI and ARP are mapped to a single EPS bearer.

EPS bearer QoS: QCI and ARP correspond to a basic QoS parameter commonly applied to all EPS bearers. An EPS bearer is classified into a GBR type bearer and a non-GBR type bearer according to a QCI resource type. A default bearer always corresponds to the non-GBR type bearer and a dedicated bearer can be configured as either the GBR type bearer or the non-GBR type bearer. A GBR type bearer QoS parameter includes QCI, ARP, GBR (DL/UL) and MBR (DL/UL). A non-GBR type QoS parameter includes QCI, ARP, APN-AMBR (DL/UL) and UE-AMBR (DL/UL).

Besides the QCI and the ARP, the GBR type bearer includes GBR and MBR as a QoS parameter. This means that a fixed resource is allocated according to a bearer. On the contrary, the non-GBR type bearer includes AMBT (aggregated maximum bit rate) as a QoS parameter. This means that a maximum bandwidth capable of being used with different non-GBR type bearers is assigned although a resource is not allocated according to a bearer. The APN-AMBR corresponds to a maximum bandwidth capable of being shared by non-GBR type bearers in an identical PDN and the UE-AMBR corresponds to a maximum bandwidth capable of being shared in an identical UE. If a UE includes a plurality of PDN connections, sum of the APN-AMBR of each of a plurality of the PDN connections cannot exceed the UE-AMBR.

In the following, a definition on a trigger condition used for measuring a secondary system (e.g., AP) is described. A trigger condition necessary for a UE to initiate other RAT measurement is explained in the following.

(1) A condition triggering measurement of a neighboring AP in a stage that a UE does not initiate measurement can be determined by traffic transmitted via radio resource configuration (e.g., DRB (data radio bearer) addition). The condition can be determined by a new EPS bearer QoS type defined according to GBR, non-GBR or a technology according to the present invention. When multi-RAT capability negotiation (S410 or S420 to S450) is performed, if traffic preferred to be transmitted via an AP is defined and the traffic is generated by the radio resource configuration, the UE may initiate the AP measurement.

(2) If IEEE 802.11 (WLAN, AP) is selected as a system preferred by radio resource configuration, a UE may initiate measurement of a neighboring AP.

Meanwhile, an eNB can transmit a metric initiating the measurement as a UE-specific value to the UE using a unicast message. In the following description, a traffic type used for determining a trigger condition for secondary system (e.g., AP) measurement is explained.

Traffic Characteristics in LTE

As traffic transmitted via a cellular network are diversified, if an eNB knows characteristics of the traffic and appropriately processes a radio bearer in accordance with the characteristics, performance of a whole system can be enhanced. Yet, according to a current LTE system, service data flow (SDF) is classified according to a specific QoS policy in an APN (P-GW) level only, a QoS level is defined and a service appropriate for the QoS level is provided.

A P-GW defines a SDF QoS, a service data flow classified by 5-tuple (a source IP, a destination IP, a source port number, a destination port number and a protocol ID), according to a QoS policy. The SDF QoS is mapped to an EPS bearer QoS again. The EPS bearer of current LTE has two types, i.e., default/dedicated EPS bearer.

As shown in FIG. 5, an eNB or an LTE system defines an LTE EPS bearer as more subdivided QoS levels using a corresponding QoS definition and the eNB can provide a different service according to a corresponding type. To this end, like an SDF QoS, as a method of distinguishing an EPS bearer from each other using EPS bearer QoS types, it may use types described in the following.

Example) voice (conversational real time service), streaming video (streaming real time service), web browsing (interactive BE service), telemetry/emails (background BE service)

EPS bearer type 1: a bearer basically generated as a default EPS bearer when connection is established EPS bearer type 2: best effort service type EPS bearer type 3: real time service

"".

EPS bearer type n: streaming video service

Figure 6:
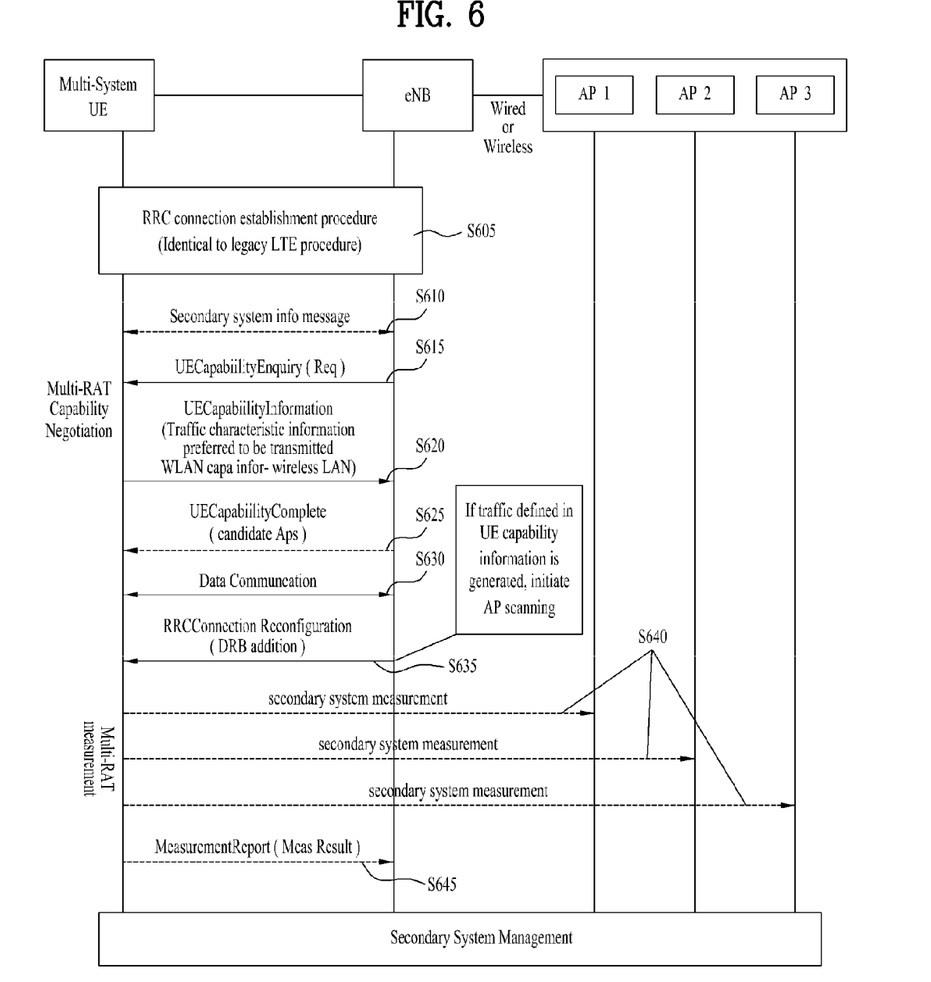
FIG. 6 is a flowchart for explaining a method of selecting a system using a QoS class defined in LTE.

FIG. 6 is a flowchart for explaining a method of selecting a system using a QoS class defined in LTE.

Referring to FIG. 6, a step S605 to a step S630 sequentially correspond to a step S410 to a step S460 in FIG. 4. Contents of the step S410 to the step S460 mentioned earlier in FIG. 4 can be applied to the step S605 to the step S630.

Subsequently, a UE can receive an RRC connection reconfiguration message (e.g., RRCConnectionReconfiguration message) from an eNB [S635]. The RRC connection reconfiguration message can be transmitted in a manner of additionally including a data radio bearer in the RRC connection reconfiguration message. As mentioned earlier in the triggering condition (1) used for initiating a different radio access technology measurement of the UE, whether to trigger measurement of a neighboring AP can be determined by a traffic type transmitted via radio resource configuration (e.g., DRB adition). Whether to trigger the measurement of the neighboring AP can be determined by a new EPS bearer QoS type (or a traffic type) which is defined according to GBR, non-GBR or a technology of the present invention.

As mentioned in the foregoing description, if a traffic type, which is transmitted in a manner of being included in the RRCConnectionReconfiguration message, corresponds to a traffic type satisfying a triggering condition, the UE can perform measurement for a base station (e.g., neighboring APs (AP1, AP2 and AP3) in FIG. 6) using a different radio access technology [S640]. Subsequently, the UE reports a measurement result to the eNB [S645].

Method of Selecting a System Using a QoS Class Defined in LTE

According to a technology of the present invention, it is able to make an eNB (or such a network entity as a multi-RAT management entity) select a system appropriate for traffic using a previously defined EPS bearer type. It may be difficult to select an appropriate system using a legacy classification criterion for a data flow (i.e., GBR or non GBR). The technology of the present invention can determine to make an eNB transmit a specific traffic type (or specific flow(s)) to a network (e.g., WLAN, i.e., secondary system) using a radio access technology different from a radio access technology of LTE network according to information received from a UE using a previously defined EPS bearer type. To this end, the eNB delivers traffic corresponding to a traffic type preferred to receive to an AP via the WLAN transmitted in the step S620, the UE receives the traffic corresponding to the traffic type preferred to receive from the AP via the WLAN and traffic corresponding to a different traffic type can be simultaneously received via a LTE network.

When a network entity lower than an S-GW or an eNB manages flows of a multi-RT UE, a RAT to be used for traffic (or a flow) of the UE can be selected to maximize performance of a whole system in a manner that the eNB receives information on a network (i.e., secondary system) using a different radio access technology via the UE and compares/analyzes the information with information on a serving cell (i.e., a cell to which a currently connected primary system belongs). In the present invention, assume that a main agent for the selection becomes the eNB.

If a network entity higher than a P-GW is capable of managing a RAT of a UE, the network entity should be able to receive status information on a heterogeneous network such as the UE and a cellular/WLAN. When multi-RAT capability negotiation is performed, if a traffic characteristic preferred to be transmitted via a wireless LAN (i.e., an accessible RAT according to a capability of the UE) is shared between the UE and the eNB, it is able to make the eNB search for a status of a wireless LAN (i.e., secondary system) using the information on the heterogeneous network in case that a specific traffic is generated and the traffic corresponds to a traffic preferred to be transmitted via the wireless LAN (i.e., secondary system).

According to various embodiments of the present invention, a UE supporting both cellular and WLAN can efficiently select a heterogeneous network for a flow via a control of a cellular network in a wideband wireless communication system.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of supporting signal transmission and reception using two or more radio access technologies (RATs) by a user equipment (UE), the method comprising:
receiving, by the UE from a base station of a first communication network supporting a first RAT, a first message for requesting information regarding whether the UE supports simultaneous access to the two or more RATs;
transmitting, by the UE to the base station of the first communication network, a second message containing an indicator indicating whether the UE supports the simultaneous access to the two or more RATs in response to the first message,
wherein the second message further contains information indicating a preferred evolved packet system (EPS) bearer QoS type which the UE desires to receive from a base station of a second communication network supporting a second RAT; and
simultaneously receiving by the UE:
traffic corresponding to the preferred EPS bearer QoS type indicated by the second message, from the base station of the second communication network; and
traffic corresponding to a EPS bearer QoS type which is different from the preferred EPS bearer QoS type, from the base station of the first communication network.

2. The method of claim 1, further comprising:
receiving, from the base station of the first communication network in response to the second message, a third message containing information regarding a candidate base station of the second communication network.

3. The method of claim 2, further comprising:
performing scanning based on the information regarding the candidate base station; and
simultaneously exchanging data with a base station of the second communication network selected as a result of the scanning and the base station of the first communication network.

4. The method of claim 1, wherein the first message and the second message are exchanged with the base station of the first communication network in case of performing an initial network entry procedure.

5. The method of claim 1, wherein the first message corresponds to a UECapabilityEnquiry message and wherein the second message corresponds to a UECapabilitylnformation message.

6. The method of claim 1, wherein the first communication network is a primary communication network and the second communication network is a secondary communication network.

7. The method of claim 1, wherein the first communication network is a cellular network and the second communication network is a wireless LAN (WLAN).

8. A user equipment (UE) that supports transmission and reception using two or more radio access technologies (RATs), the UE comprising:
a receiver;
a transmitter; and
a processor that:
controls the receiver to receive, from a base station of a first communication network supporting a first RAT, a first message for requesting information regarding whether the UE supports simultaneous access to the two or more RATs,
controls the transmitter to transmit, to the base station of the first communication network in response to the first message, a second message containing an indicator indicating whether the UE supports the simultaneous access to the two or more RATs,
wherein the second message further contains information indicating a preferred evolved packet system (EPS) bearer QoS type which the UE desires to receive from a base station of a second communication network supporting a second RAT, and
controls the receiver to receive simultaneously:
traffic corresponding to the preferred EPS bearer QoS type indicated by the second message, from the base station of the second communication network; and
traffic corresponding to a EPS bearer QoS type traffic typo which is different from the preferred EPS bearer QoS type, from the base station of the first communication network.

9. The UE of claim 8, wherein the first communication network is a primary communication network and the second communication network is a secondary communication network.

10. The UE of claim 8, wherein the first communication network is a cellular network and the second communication network is a wireless LAN (WLAN).

* * * * *